(12) United States Patent
Chien (10) Patent No.: US 11,277,010 B2
(45) Date of Patent: Mar. 15, 2022

(54) LED NIGHT LIGHT WITH EDGE-LIT LIGHT GUIDE

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 16/395,487

(22) Filed: Apr. 26, 2019

(65) Prior Publication Data

US 2019/0319470 A1    Oct. 17, 2019

Related U.S. Application Data

(63) Continuation-in-part of application No. 11/498,874, filed on Aug. 4, 2006, now abandoned, which is a
(Continued)

(51) Int. Cl.
*F21S 8/00* (2006.01)
*H02J 7/00* (2006.01)
(Continued)

(52) U.S. Cl.
CPC .................. *H02J 7/00* (2013.01); *F21S 6/003* (2013.01); *F21S 8/035* (2013.01); *F21V 15/01* (2013.01); *F21V 23/02* (2013.01); *F21V 23/023* (2013.01); *F21V 23/06* (2013.01); *F21V 33/00* (2013.01); *F21V 33/0004* (2013.01); *F21V 33/0024* (2013.01); *F21V 33/0048* (2013.01); *F21V 33/0056* (2013.01); *G02B 6/0045* (2013.01); *G04B 19/30* (2013.01); *G06F 1/266* (2013.01); *G09F 23/00* (2013.01); *H01R 13/6691* (2013.01); *H01R 25/006* (2013.01); *H02G 3/14* (2013.01); *H02J 4/00* (2013.01); *H02J 7/007* (2013.01); *H02J 7/0042* (2013.01); *H02J 7/0047* (2013.01); *F21V 23/0442* (2013.01); *F21V 33/006* (2013.01); *F21W 2121/00* (2013.01); *F21Y 2115/10* (2016.08); *G02B 6/0021* (2013.01); *H01H 2009/186* (2013.01); *H01R 13/713* (2013.01); *H01R 24/76* (2013.01); *H01R 2103/00* (2013.01); *H02J 2207/20* (2020.01)

(58) Field of Classification Search
CPC ........ F21S 8/035; F21V 9/16; F21V 23/0442; F21W 2131/30; F21K 9/232; F21K 9/61
See application file for complete search history.

(56) References Cited

U.S. PATENT DOCUMENTS

| | | | |
|---|---|---|---|
| 2,841,695 A | 7/1958 | Bentsen | |
| 3,056,897 A * | 10/1962 | Knochel | ................ H05B 33/06 313/483 |

(Continued)

FOREIGN PATENT DOCUMENTS

JP    2002-100203 A    4/2002

*Primary Examiner* — Ismael Negron
(74) *Attorney, Agent, or Firm* — Bacon & Thomas, PLLC (57) ABSTRACT

A night light includes a housing, AC-to-DC circuitry, at least two prongs configured to connect to a power source outlet, at least one LED, first and second optical elements for converting light beams from the LED into substantially uniform light emitted from the optical elements, a switch configured to manually select from a plurality of illumination modes, sensors to automatically select between the illumination modes, and means for wireless communication, and at least one second optical element. The LED might be a multi-color LED.

18 Claims, 4 Drawing Sheets

Related U.S. Application Data continuation of application No. 10/954,189, filed on Oct. 1, 2004, now abandoned, application No. 16/395,487, filed on Apr. 26, 2019, which is a continuation-in-part of application No. 16/298,110, filed on Mar. 11, 2019, now Pat. No. 10,753,561, which is a continuation-in-part of application No. 16/285,631, filed on Feb. 26, 2019, now Pat. No. 10,907,784, which is a continuation-in-part of application No. 14/739,397, filed on Jun. 15, 2015, now Pat. No. 10,184,624, which is a continuation-in-part of application No. 11/806,285, filed on May 31, 2007, now Pat. No. 11,082,664, application No. 16/395,487, filed on Apr. 26, 2019, which is a continuation-in-part of application No. 16/285,631, filed on Feb. 26, 2019, now Pat. No. 10,907,784, which is a continuation-in-part of application No. 16/242,761, filed on Jan. 8, 2019, now Pat. No. 11,142,165, which is a continuation of application No. 14/739,397, filed on Jun. 15, 2015, now Pat. No. 10,184,624, which is a continuation-in-part of application No. 11/806,285, filed on May 31, 2007, now Pat. No. 11,082,664, said application No. 16/285,631 is a continuation-in-part of application No. 11/498,874, filed on Aug. 4, 2006, now abandoned, which is a continuation of application No. 10/954,189, filed on Oct. 1, 2004, now abandoned.

(51) Int. Cl.

| | | |
|---|---|---|
| *F21V 33/00* | (2006.01) | |
| *G09F 23/00* | (2006.01) | |
| *G04B 19/30* | (2006.01) | |
| *H01R 25/00* | (2006.01) | |
| *H01R 13/66* | (2006.01) | |
| *F21V 23/02* | (2006.01) | |
| *F21V 8/00* | (2006.01) | |
| *H02G 3/14* | (2006.01) | |
| *H02J 4/00* | (2006.01) | |
| *F21S 6/00* | (2006.01) | |
| *F21V 15/01* | (2006.01) | |
| *F21V 23/06* | (2006.01) | |
| *G06F 1/26* | (2006.01) | |
| *H01H 9/18* | (2006.01) | |
| *F21Y 115/10* | (2016.01) | |
| *F21W 121/00* | (2006.01) | |
| *H01R 103/00* | (2006.01) | |
| *F21V 23/04* | (2006.01) | |
| *H01R 13/713* | (2006.01) | |
| *H01R 24/76* | (2011.01) | |

(56) References Cited

U.S. PATENT DOCUMENTS

| | | | |
|---|---|---|---|
| 3,779,630 A | 12/1973 | Clausen | |
| 4,177,500 A * | 12/1979 | Nicholl | F21S 9/022 315/86 |
| 4,337,506 A | 6/1982 | Terada | |
| 4,343,032 A * | 8/1982 | Schwartz | F21V 23/0442 362/276 |
| 4,385,343 A | 5/1983 | Plumly | |
| 4,992,704 A * | 2/1991 | Stinson | H05B 45/40 315/312 |
| 5,390,436 A | 2/1995 | Ashall | |
| 5,544,025 A | 8/1996 | Bohlool | |
| 5,662,408 A | 9/1997 | Marischen | |
| 5,926,440 A * | 7/1999 | Chien | F21S 8/035 362/253 |
| 5,947,578 A | 9/1999 | Ayres | |
| 5,964,516 A | 10/1999 | Lai | |
| 6,124,672 A | 9/2000 | Burke | |
| 6,158,868 A * | 12/2000 | Chien | F21V 33/0076 362/253 |
| 6,217,186 B1 | 4/2001 | Fisher | |
| 6,390,647 B1 * | 5/2002 | Shaefer | F21S 8/035 362/267 |
| 6,431,719 B1 * | 8/2002 | Lau | A61M 21/02 362/23.18 |
| 6,472,730 B1 | 10/2002 | Yanagawa et al. | |
| D471,654 S | 3/2003 | Schenck | |
| 6,669,468 B2 | 12/2003 | Pesu | |
| 6,709,126 B1 | 3/2004 | Leen | |
| 6,846,098 B2 | 1/2005 | Bourdelais | |
| 6,926,426 B2 * | 8/2005 | Currie | F21S 8/035 362/147 |
| 6,971,758 B2 | 12/2005 | Inu | |
| 7,255,471 B2 * | 8/2007 | Diorio | F21S 8/035 362/353 |
| 2004/0004827 A1 | 1/2004 | Guest | |
| 2004/0246704 A1 | 12/2004 | Burdick | |
| 2006/0007709 A1 * | 1/2006 | Yuen | F21S 8/035 362/641 |
| 2006/0062019 A1 | 3/2006 | Young | |
| 2006/0077684 A1 * | 4/2006 | Yuen | F21S 8/035 362/555 |
| 2006/0209569 A1 * | 9/2006 | Yuen | F21S 8/035 362/641 |

* cited by examiner

LED NIGHT LIGHT WITH EDGE-LIT LIGHT GUIDE

This application is a continuation of (# R-6) Multiple function LED night light
U.S. patent application Ser. No. 16/298,110 filed on Mar. 11, 2019, which is a CIP of (#R-5) Multiple Function LED night Light
U.S. patent application Ser. No. 16/285,631 filed Feb. 26, 2019 which is a CIP of #R-4) Multiple function LED night light
U.S. patent application Ser. No. 16/242,761, filed Jan. 8, 2019, which is a CIP of (#R-3) Multiple function LED night light
U.S. patent application Ser. No. 14/739,499, filed Jun. 15, 2015, now is U.S. Pat. No. 10,487,999 issued on Nov. 26, 2019 which is a CIP of (#R-2) Multiple function LED night light
U.S. patent application Ser. No. 14/739,666, filed Jun. 15, 2015, now is U.S. Pat. No. 10,508,784 issued on Dec. 17, 2019 which is a CIP of (#R-1) U.S. Pat. No. 10,184,624 Multiple function LED night light
U.S. patent application Ser. No. 14/739,397, filed Jun. 15, 2015, now is U.S. Pat. No. 10,184,624 issued on Jan. 22, 2019 which is a CIP of (#R-07) (Still pending for over 12 years)
U.S. patent application Ser. No. 11/806,285, filed May 31, 2007, which is a CIP of
U.S. patent application Ser. No. 10/954,189 filed on Oct. 1, 2004, now abandoned.
U.S. patent application Ser. No. 10/954,189 "An electro-luminescent (EL) illuminated wall plate device with push-tighten frame means" filed Oct. 1, 2004; which is a CIP of
U.S. patent application Ser. No. 14/739,397, filed Jun. 15, 2015.
This application is continuation of
U.S. patent application Ser. No. 10/883,747 filed on Jul. 6, 2004.
This application is a continuation of (#Q-07) now U.S. Pat. No. 7,632,004 LED night light with more than one optic means
U.S. patent application Ser. No. 11/806,284, filed May 31, 2007, now is U.S. Pat. No. 7,632,004 issued on Dec. 15, 2009
This application is a continuation of (#K-06)
LED night light has area-illumination by multiple time reflection and refraction U.S. application Ser. No. 11/498,874 file don Aug. 4, 2006 (Still pending)
This application is a continuation of
U.S. application Ser. No. 10/954,189 filed on Oct. 1, 2004.
This application is a continuation of (M-06) U.S. Pat. No. 7,611,253 multiple functions LED night light with air freshener
U.S. patent application Ser. No. 11/527,628, filed Sep. 27, 2006, now is U.S. Pat. No. 7,611,253 issue on Nov. 3, 2009,
This application is a continuation of (#L) now U.S. Pat. No. 8,545,090 LED night light with changeable display unit
U.S. patent application Ser. No. 11/527,629, filed Sep. 27, 2006, now is U.S. Pat. No. 8,545,090 issue on Oct. 1, 2013,
This application is a continuation of (#H-1) U.S. Pat. No. 8,029,182 multiple light source night light
U.S. patent application Ser. No. 12/546,012, filed Aug. 24, 2009, now is U.S. Pat. No. 8,029,182 issue on 10-4-201, which is a continuation of (#H-05) U.S. Pat. No. 7,455,444 Multiple light source Night light
U.S. patent application Ser. No. 11/255,981, filed Oct. 24, 2005, now is U.S. Pat. No. 7,455,444 issued on Nov. 25, 2008
This application is continuation of
1. U.S. patent application Ser. No. 10/954,189 "An electro-luminescent (EL) illuminated wall plate device with push-tighten frame means" filed Oct. 1, 2004; and
2. U.S. patent application Ser. No. 11/094,155 "Multiple function wall cover plate" filed on the Mar. 31, 2005; and
3. U.S. patent application Ser. No. 11/094,156 "Multiple functions night light" filed on the Mar. 31, 2005; and
4. U.S. patent application Ser. No. 10/667,787 "Multiple lit-area(s) of Electro-Luminescent element(s) arrangement"; and 5. U.S. patent application Ser. No. 10/286,871 "A tubular Electro-Luminescent light device"; and
6. U.S. patent application Ser. No. 10/621,513 "environment proof treatment for Electro-Luminescent (EL) element(s); and
7. U.S. patent application Ser. No. 11/094,215 "LED night light with liquid arrangement" filed on Mar. 31, 2005 and
8. U.S. patent application Ser. No. 11/255,981 "Night light with 2 light source" filed on Oct. 24, 2005.

BACKGROUND

The current invention uses simple optic-lens or optic-element(s) to eliminate the narrow-angle LED light source spot-light and change to more even brightness light beam emitted out from LED light optic-lens by multiple times reflections and refractions of LED light-beams between the at least two of inner surfaces of (1) 1st optic-element, (2) 2nd optic-element, (3) home wall, (4) LED light inner housing or parts or wall, (5) isolated narrow space inside the LED light. Wherein, the LED light-beams go through N(N is any number) times of reflections and refractions within preferred parts or area of LED light including (A) area surrounded by 1st and 2nd optic-lens and home wall, and 2nd optic-lens has open rear-housing enable light beam directly to emit to home wall, (B) area is inside of a sealed prong unit and all light-beam travel inner surface without direct emit to home wall.

The current invention is child parent case of
1. U.S. patent application Ser. No. 10/954,189 filed on Oct. 1, 2004, now abandoned, and CIP of
2. (# K-2006) LED night light has area-illumination by multiple time reflection and refraction.
   U.S. patent application Ser. No. 11/498,874 file don Aug. 4, 2006 (Still pending). Which is CIP of
3. (# R-6) Multiple function LED night light
   U.S. patent application Ser. No. 16/298,110 file don Mar. 11, 2019, which CIP of
4. (#R-5) Multiple function LED night light
   U.S. patent application Ser. No. 16/285,631 filed Feb. 26, 2019 which CIP of
5. (#R-4) Multiple function LED night light
   U.S. patent application Ser. No. 16/242,761, filed Jan. 8, 2019, which CIP of
6. (#R-3) Multiple function LED night light
   U.S. patent application Ser. No. 14/739,499, filed Jun. 15, 2015, which CIP of
7. (#R-2) Multiple function LED night light
   U.S. patent application Ser. No. 14/739,666, filed Jun. 15, 2015, which CIP of 8. (#R-1) Multiple function LED night light
   U.S. Pat. No. 10,184,624 Multiple function LED night light U.S. patent application Ser. No. 14/739,397, filed Jun. 15, 2015, now is U.S. Pat. No. 10,184,624 issued on Jan. 22, 2019
9. (#R-07) Multiple function LED night light (Still pending)
   U.S. patent application Ser. No. 11/806,285, filed May 31, 2007,
10. (#Q-2007) for LED night light has more than one optic-element
    U.S. patent application Ser. No. 11/806,284, filed May 31,2007, now is U.S. Pat. No. 7,632,004 issued on Dec. 15, 2009 which CIP of
11. U.S. patent application Ser. No. 11/498,874 file don Aug. 4, 2006, which CIP of
12. (# H-2005) for night light has more than one LED light-source
    U.S. patent application Ser. No. 11/255,981, filed Oct. 24, 2005, now is U.S. Pat. No. 7,455,444 issued on Nov. 25, 2008 Which is CIP of
13. U.S. patent application Ser. No. 10/954,189 file don Oct. 1, 2004, now abandoned for "An electro-luminescent (EL) illuminated wall plate device with push-tighten frame means"

One of preferred embodiment, the current invention second optic-element of LED night light has open-rear end so LED light-beam enable to emit to wall of home directly which not only save cost of the 2nd optic-element but also emit light beam to home wall to form shaped light effects.

The said 1st optics-element is one of a flat, dome, tube or bar shape to enable light-beam to go through, prevent people touching inner LED and electric parts, or make multiple reflections or refractions within to change from spot-light(s) to area/surface/uniform brightness light performance. This can make whole 2nd optic-lens whole or main surface to achieve even brightness.

This is simple but fatal improvement for the said second optical element lack at least one rear, top, or sides housing or wall.

The current invention disclosure 4 preferred optical arrangements to eliminate dice, chip, COB, LED light-source(s) spot-light(s) and create better even brightness to be seen from whole or main surface of the 2nd optics-lens.

The current invention makes improvement for all prior arts those use the diffusor to LED within a diffusing optical element that reduce or loss LED brightness. Hereafter, discuss and compare with prior arts including;

1. US prior art:
   U.S. Pat. No. 4,729,069 VON KOHORN for door holder by battery operated is not same category with current invention.
2. US prior art:
   U.S. Pat. No. 6,231,057 WILLIAMS same as door holder by battery operated is not same category with current invention.
3. US Prior art:
   U.S. Pat. No. 6,499,853 STEKELENBURG which is for electro-luminescent (E.L.) light source which is drive by AC 1 10 Volt directly so not same as current LED night light have to have built-in AC-to-DC circuit to get DC to operate LED light source(s) which is one of DIODE unit.
4. US prior art:
   U.S. Pat. No. 6,648,496 GE for contour light arrangement and arrange 4 LEDs on 4 corners of rectangular shape of night light and emit the LED light-beam to opposite-direction which is not same as current for multiple times reflection and refraction physical theory.
5. US prior art:
   U.S. Pat. No. 6,709,126 LEEN, or U.S. Application. Ser. No. 10/302,460 Leen. '126 has diffusing tubular inner optic-element (85) has 2 Tubular-shape LEDs (81) (83) emit to each other with diffusor-effects and arranged other optics-lens(30) to further to reduce the light brightness and goes through the 90 degree VS light-beam emit-out direction opening or window (48) of exterior-cover (40) to change light-emitting direction. This is not same as the current for multiple reflection and refraction for light-beam arrangement and the even brightness light-beam is visible from said $2^{nd}$ optic-lens whole surface not from the opening or window of external cover's horizon window which is face floor . . . . Not whole surface of $2^{nd}$ optics which for '126 should be (30) whole surface. Also, the diffusor is sealed all light-beam within and reduce too much brightness. '126 LED light-source is strange because (81) (84) is tube light which is not dip or dice or chip LEDs or COB LEDs than current invention any drawing for light source(s).
6. US prior art:
   U.S. Pat. No. 6,964,498 WU
   '498 device as FIG. 5 has LED (6E) (6F) within a ball shape unit (6H) and arrange on lower position of housing. The '498 ball spread light to all direction like put a mini-size incandescent-bulb on lower position of housing, so it will same as out-of-date incandescent bulb application the lower portion of the outside shade (6C) with super bright spot-light effects and top of the shade (6C) is darker area because light-brightness is for 2 square of distance to reduced.
   So, 498 is bad optics-design and still show the brighter spot-light effects as mini-incandescent-bulb light performance.
   From FIG. 7 and FIG. 8 show the light-source under the top optic-lens which emit light-beam to top areas to make the inside decorative-items be lighted which are not same as current invention for show out even-brightness lighted areas or surface without the decorative-items existing at all. Same as FIGS. 9, 10. 11 same as above discussed for display the decorated-items which is not same as current to create even-brightness area or surface light performance.
7. US prior art:
   U.S. Pat. No. 7,045,975 EVANS
   Show 2 LED(s) emit the spot-light from top and end window to ceiling and floor for power fail light and while AC power existing the lower LED (30) will turn on to offer night light illumination but it will be spot light because the said '975 without any optics-elements to change the LED spot-light from DIP specification LEDs to even-brightness. At that year 2004 even the LED is too dim color and no white color LED with good brightness so no one is filed for the even-brightness related patents at that time.
8. US prior art:
   U.S. Pat. No. 7,932,482 NORWOOD ET.AL.
   '482 FIGS. 11,12,13,14, drawing has the LEDs in front and back and connect with outlet by AC-plug-wire (344) (342) not same as current invention for built-in prong without the wire.

'482 FIG. 1 to FIG. 4 has dip-type LEDs (7) just install within one of treated or textured lens (15) is not enough as the co-pending and parent filed case (# G-2007). The current invention has to hide the LED(s) to be seen by viewer for sealed-unit LED night light and all LED(s) need behind of within the lower-base or inside housing to prevent people to see LED directly. So, this is not same as current invention which need at least 1st and 2nd optic-lens or optical element or 1st reflector to make the LED unit(s) not direct to see by viewer. From '482 which the additional air-freshener functions is follow co-inventor earlier EL and LED air freshener invention, so it is not valid patents at all.

9. US prior art:

US Application Ser. No. 2004-0246-704 BURDICK

'704 show one LED inside one optics-lens (14) and further in front LED (32) has name-tag (24) to block and make the name-tag easily to be see.

The one of any kind of texture or opaque or treated lens (12) is not able to present strong LED light-beam to be seen such as spot-light, so the '704 is not same as the current invention.

10. US prior art:

U.S. Application. Ser. No. 2006-000-7709 YUEN

'709 show the Dip LED (2) fit within a two-end opening tube (10) and light emit out and hit the 2nd reflector (11) on top-opening of tube (10) and light-beam hit the sharp top reflector and emit out to barrel-shape lens (6). This is different with current invention for (A) LED light has open-rear housing because '709 has 360 degree lens, and (B) LED is fit or install inside of prong base or sealed unit to make the light-beam have reflected or reflected or refracted by 1st optical element or 1st optic-lens. The '709 1st optical element is tube shape diffusor and light is not reflected and refracted multiple-times within the 1st optic-tube and emit out. '709 light-beam emit and go through inner of tube (10) and go $2^{nd}$ optics-element is reflector (11). Not same as optic-arrangement with current invention with flat or tube or dome or bar 1st optical element to have multiple times reflection and refraction WITHIN the 1st optical element which is not diffusor at all.

And from current invention parent filed case (# G-2007) which has built-in top or cone for narrow tip to make the multiple times reflection and refraction within the tube or cone optic-elements.

11. U.S. prior art:

U.S. Pat. No. 6,987,710 same inventor as U.S. Pat. No. 7,054,233 both prior art teach the illumination module back surface has the reflective properties to allow the light beam reflect in the interior of the module and out from the front surface (Abstract line 7 to line 9, and the details description stating The back side of reflectors 38, 48 or 78 could alternatively be engraved to provide multiple raised surfaces, such as points, bumps, protuberances, or the like. FIGS. 14 and 15 illustrate surfaces 86 and 87, respectively, created by dot engraving techniques).

The '710 and '233 are both said illumination module is very expensive to make this compare with current invention.

Further, the prior art control the light beams only "out of the front surface" this is mission impossible and do not control at all. The current invention, the light emits out to all directions to all surface though the $2^{nd}$ optic-lens surface to viewer. The both KIIBILO-SKI prior art did not teach LED light source is not visible by viewer and all light-beams is travel within the inner space for multiple times reflection and refractions within limited space of LED night light to make the even-brightness illumination to get the best photometric and make the cosmetic appearance for the visible surface so it is impossible to make a commercial items without this frosted front sheet on top of the illumination module.

The current invention further may incorporate more colorful LED(s) to make color changing, color selection, functions-selection which is not show on any of prior arts.

The LED are positioned to make majority of light beams travel within or travel through the $1^{st}$ optic-element(s) or optic-lens and to be seen the brightness on 2nd optic-lens whole surface basing the well arrangements for multiple reflections and refractions but not using diffusing theory of the light-beam.

From U.S. patent application Ser. Nos. 11/286,284 and 11/806,285, background and details specification clearly stats one optic-lens still fail to prevent people from seeing super brightness spot-light of LED(s), in order to get substantially uniform brightness shown on outer optical element it is needed good multiple reflections and refractions and having the 1st or-and 2nd optics-element or optic-lens to eliminate the spot-light and create the even brightness.

This is not same as other optics designs or arrangements which have shinny surfaces and a lot of raised spots piece built in or lay on lower surface to make the single LED light spot become a plurality of tiny or small light spots with front frosted-lens to make it become even photometric.

Those tiny or plurality of tiny spot-light(s) light-effects is not a good arrangement, and it still needs other optic-lens to help to eliminate the big or small or plurality of spot-light(s) by multiple reflections and refractions to get even brightness which is called indirect light illumination. The other optics designs from conventional market adapted very expensive shinny or special optics surfaces optics parts, the current invention has a roughly or whitened treatment can get better and more even photometric under much lower costs. This is big improvement than the other optics design.

The other features of the current invention disclosure the LED circuit within a sealed prong unit or prong housing for very important to improve the LED night light safety.

The sealed prong unit or prong housing material is, preferably, the plastic with certain thickness to pass the 94-V-0 flammable grade to meet the safety standards and all other housing parts without any limitation because one of preferred embodiment of current invention has optical element to prevent people from touching the live wires while second optical element lack at least rear wall so having open rear area.

The base can be any shape, configuration, design, curvature, thickness, material, dimension with built-in or separated receptacle unit. The sealed unit has LED related circuit, control kits, prong disposed within. The sealed unit can design for super slim and wider unit as FIGS. 1,2, 10, 11 or thicker as FIGS. 8,9,14,15 for preferred unit which depend on the market requirement. For convenience, those also can make a desired unit such as Rectangular shape.

DRAWING

FIG. 8 show the co-pending U.S. patent application Ser. Nos. 11/806,284 and 11/806,285 and 16/298,110, 16/285,631, 16/242,761, 14/739,499, and 14/739,666 for LED night light has open-rear housing or open-rear-wall or open-rear-unit. And, light-beam emit to home-wall directly. wherein, the LED light has at least one 1st optic-lens or optical element is a flat or planar piece, tube or dome with top-end, cone with sharp-end in order to (1) prevent people from touching the inside or lower position LED(s) or (2) make the light-beam multiple times reflections and refractions within the tube or dome or cone to change spot-light(s) to area/tube/dome/cone to emit light to desired height and directions.

DETAIL DESCRIPTION

Figure 1:
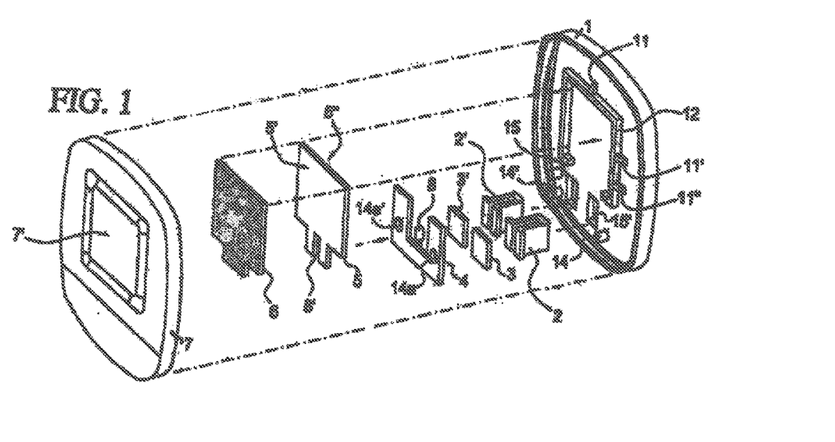
FIG. 1 show co-pending U.S. patent application Ser. No. 11/498,874 details construction with Dip LED has at least 1st and 2nd optical elements to eliminate the spot-light and create the substantially even brightness light illumination show from window of front frame or cover.

From FIG. 1, show the drawings of U.S. patent application Ser. No. 11/498,874, filed Aug. 4, 2006. The LED night light consists front housing (7) and back housing (1) with opening (15) (15') to install prong (2') (2). The two isolating-unit(s) (3') (3) may optionally add top of the prong to prevent any electric shortage under unexpected condition. It also appreciated the prongs can be directly soldered on the PCB (4) which has AC-to-DC circuit within. The LED related circuit (not shown) and control system (not shown) and one of preferred DIP LED(s) (8) are arranged on the printing circuit board (hereafter as PCB) (4) which between the front housing (7) and back housing (1).

The DIP LED (8) are positioned with light passable piece (5) input-end (8') to make majority of light beams travel within the said light passable piece (5), and light beam emit out from light passable piece (5) edge (5") to surround-wall (12) which is higher than the light passable piece (5) to make multiple times reflections between the light passable piece and surrounding walls. This optical arrangement for LED light beam traveling and reflected back and forth to eliminate the LED super bright spot light(s) to substantially even brightness and emit out from the front surface of light passable-piece (5) through the window (7') of front housing (7). The surrounding wall(s) prevent limited LED light beam emit to areas where not under said window to reduce the brightness to be seen.

The alternative or optional preferred arrangement is to add one opaque or rough or white thin piece (6) top of the light passable piece (5) to increase more evenly brightness of light-beam.

This is not same as other optics design which have shinny surface and with a lot of raised spots on lower built-in or added surface to make the single LED light spot become a plurality of tiny light spots with front frosted lens or piece or film to make it become even photometric. Those prior arts still have a lot of tiny brighter spot lights can be seen. So, the prior arts is not really even brightness as the current invention having surrounding walls (12) to make multiple reflections to create substantially uniform brightness shown from window (7').

Figures 2, 2A:
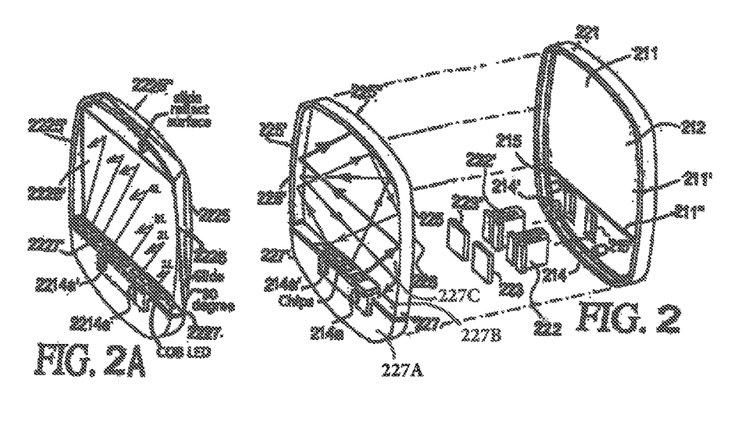
FIG. 2 Show the 1st one of preferred improvement or alternative device which has chip or dice LED(s) arrangement to allow light beam travel within the sealed housing inner narrow space for multiple times reflections and refractions which only has one optic-lens or optical element to show even brightness to viewer.
FIG. 2A show the 2nd one of preferred improvement or replaceable device which has COB (chips on board) in preferred shape including light-strip or other shape, and COB or LED light source fit in front or side of a reflective unit which is one of slope or tilt or planar unit having preferred degree to allow each LED or COB light beam hit the 1st optic-element which is reflect able unit or piece or inner housing and emit out from front 2nd optic-lens or optical element with preferred white, opaque, textures or treatments for even brightness illumination to view with single or multiple colors or steady or dynamite or moving or changeable light effects.

One of preferred embodiment as FIG. 2A shown, the current invention incorporate with recessed located COB (Chip on board, hereafter as COB) (2227) which has plurality of LED dices (2227') or chips (2227') install on PCB but still can see brighter spot-light(s). Hence, the current invention arrange COB PCB (2227) recessed compartment (227A) or under divider wall (227B) (while COB is shorter than total width of night light). Wherein, the said divider wall (227B) is one of roof of lower body compartment (227A) where has prong, LED, COB, circuit, AC-to-DC circuit fit within and divided by wall with top light traveling isolated narrow space (227C). The said LED or COB (spot-light(s) have to be hidden in order to people do not see brighter spot light(s). One of preferred embodiment has all COB light-source(s) (2227') emit the light to front inner slide, tilt, sloop, or planar inner reflective surface(s) or unit(s) (2226) which may has 30 degree or preferred angle to make plurality of light-beams (1L)(2L)(3L)(4L) emit to reflective surface or unit(s) (2226) and reflected and emit to outer optics-lens (not shown) that has one of opaque, white, texture, or preferred treatment so can get pretty good even-brightness light performance to be seen.

The other optics design from conventional market adapted very expensive shinny surface optics parts, the current invention for FIGS. 2, 2A, 3, 4, 5, 6, 7 incorporate with very simple 1st and 2nd optics-piece can get better and substantially uniform brightness or photometric under much low cost. This 1st big improvement than the other optics design.

The frosted sheet (6) is optionally added on the visible surface (5') of the light passable piece (5") to make the cosmetic appearance to people. The preferred embodiment do not need to add such sheet but may apply the white painting or add white pigment into injection material to get good substantially uniform brightness illumination.

From FIG. 1, The light passable-piece (5) or optics-lens (5) surrounded by at least 3 sides built-in or added walls (12) on the back of housing (1) with several reinforced post (11) (11') (11") to prevent the wall broken while use assembly skill to tighten the front housing (7) and back housing (1). From FIG. 1, the PCB (4) and isolating-unit(s) (3) (3') and prong are hold on the post (14) (14') while the PCB holes (14a) (1 4a') position to the post (14) (14'). Incorporating with a screw, a melting plastic pole, a sonic sealing, a press tight, a glue, an adhesive to make the PCB (4) tightly to assembly with back housing (1).

The assembly-arrangement for front housing (7) to the back housing (1) may apply the available skill from marketplace to make the tight joint together. The window (7') of the front housing is the illumination area and located at front housing of said the night light. The current invention adapted the very simple multiple reflections and refractions theory, and LED or COB light existing from light passable piece or optics-lens (5) which having its LED input end arrangement to change the bright spot light effects of LED or COB to the substantially uniform brightness or photometric on main surface of said the light passable piece or light medium.

FIG. 2 show the alternative or up-grade design of FIG. 1. One of preferred embodiment, the LED light source is one Chip or Dice or COB LED light-source is recess into the base or compartment (227A) where under the divider or wall (227B) so people cannot see plurality of chip or dice LED light-source. Wherein, the each light source light beam emit from recess location to emit to isolated or divided narrow space (227C) where do not have any electric parts or accessories and LED of LED night light and make multiple times reflections and refractions between the (1) front display-lens, (2) inner divider or walls, and (3) inner surface of LED night light to make substantially uniform brightness or photometric and emit out from front optic-piece or optics-lens. This is one of examples for the LED night light only has one of the optic-lens or optic-piece and has one isolated narrow space for only light beam traveling to present the substantially uniform brightness or photometric to viewer. This also one details description for claim 23.

FIG. 2A show the one alternative arrangement for COB light (2227) has plurality of built-in LED light source (2227') and each LED emit the light to the 1st optic-piece is one of tilt, slide, or sloop geometric shaped reflective piece or unit (2226). One of preferred tilt angle arrangement is from COB light-source (2227) inner-edge to the LED nigh light top inner edge (as bold line of 2226). One of preferred tilt angle is around 30 degrees or preferred angle which depends on night light size and inner space. Each LED light beam emit out and hit the tilted reflective surface and reflected out from the front 2nd optic-lens (not shown). This is necessary to arrange the all light source not directly to 2nd or outer display optics-lens. All the LED(s) need emit to inner, sides, or internal reflect able surface and go through the optical element(s) to make light for substantially uniform brightness. This is one of simple solution for Dice or Chips or COB LED light-source (2227) (2227') which does not same as FIG. 1 for Dip LED light source.

Figure 3:
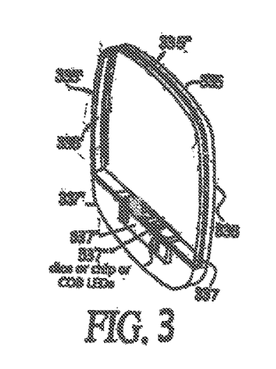
FIG. 3 show the 3rd one of preferred improvement of replacement device which same as the 1st preferred embodiment and the difference is said one optic-lens is solid piece and light-beam emits into solid piece to make multiple times reflections and refractions within the said solid-piece which may be a tube or bar or cone, or planar or flat piece as FIGS. 8, 9 or co-inventor U.S. patent application Ser. No. 11/806,284 which has linear or tube or cone or flat solid or hollow piece with or without built-in top to reflect light back and forth. This embodiment also same as co-pending Ser. No. 11/498,874 the light-beam emit into planar optic-lens or optical element which is light-passable and light emit-out to contour and hit the surrounding built-in or added walls and reflected back and forth to make multiple times reflection and emit out by multiple times refraction from solid-optic-lens.
Figure 4:
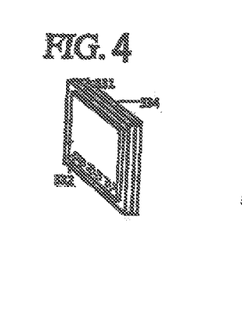
FIG. 4, 5, 6, 7 show all other preferred embodiment for LED light-source and 2nd optics lens or optical element with thin or thicker body to apply preferred optics theory for multiple times reflections and refractions within or between at least two of the inner surface of
(1) 1st, 2nd optical elements or optic-lens
(2) home wall,
(3) inner wall of LED light parts or housing for the LED light has or without the rear-housing or rear-cover or rear-base.
Figure 5:
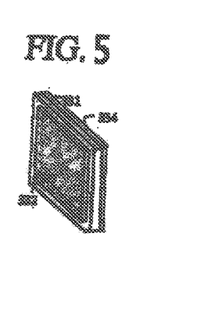
Figure 6:
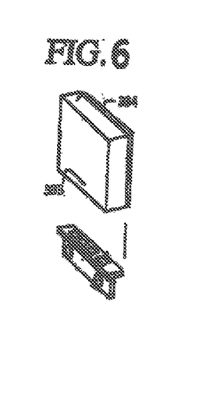
Figure 7:
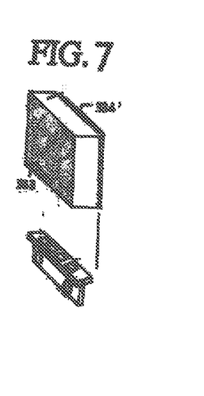

FIG. 3 show the $3^{rd}$ preferred optics-design to get substantially uniform brightness show on the solid optic lens (338') surface. The LED (337') light-beam emit into sufficient thickness solid optic lens (338') and light beam travel within the said solid optic lens (338') which for multiple times reflections and refractions, and light beam existing from solid optic lens (338') emit to surround the inner-surface of frame or wall (335') and back housing inner frame or wall (335") and inner-surface of back-housing (335) for $2^{nd}$ round multiple reflection and refraction to get desired substantially uniform brightness illumination show out on the front surface of solid-lens (338') and emit out from outer optical element. This is one of $3^{rd}$ embodiment for optic-design for eliminate the LED spot light(s) and change to substantially uniform brightness illumination.

FIGS. 4, 5, 6, 7 show (1) the only one piece optic-lens (not two optics-lens) which for display substantially uniform brightness to viewer, and (2) incorporate with at least one of inner walls, inner surface(s), inner slide or tilt reflective piece or surface of the LED night light to create substantially uniform brightness to viewer, and (3) one or two rounds multiple times reflections and refractions for the sealed-unit LED night light, and (4) all the LED light source is recessed or behind divider or fit within compartment inside the night light housing or roof or body or parts so people do not see any LED strong brightness spot-light(s) at all. This is the major design of these FIGS. 2, 2A, 3, 4, 5, 6, 7. These drawing support the following independent claims as claim 2, claim 23, claim 24.

Figure 8:
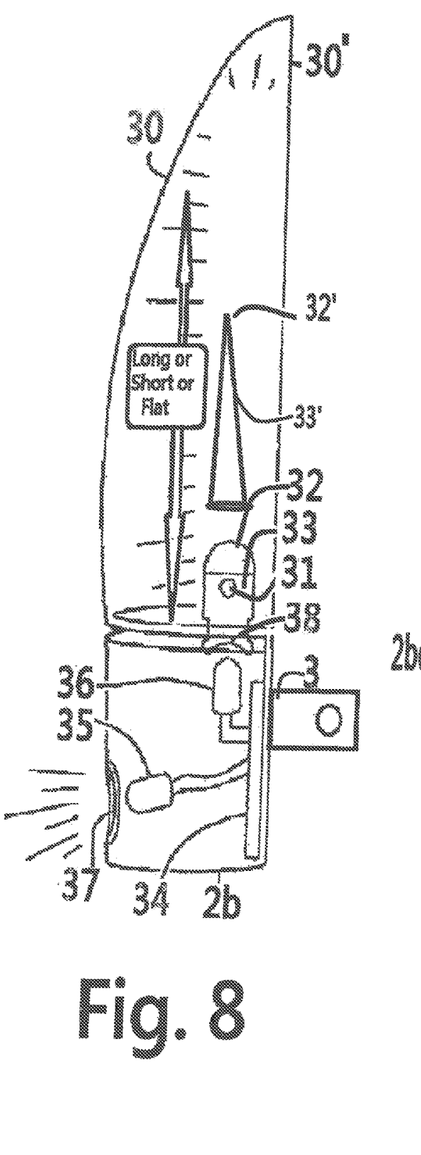

From FIG. 8 show the co-inventor co-pending U.S. patent application Ser. Nos. 11/806,284, 11/806,285, 11/498,874, 16/298,110, 16/285,631, 16/242,761, 14/739,499, 14/739,397 and 14/739,666 issued patents' concept and parent filed case.

The FIG. 8 LED night light has light display optic-lens (30) has open rear wall (30') or open rear housing (30') so LED light beam enable to emit to home wall directly because the second optical element (30) without any lens or housing or wall (30') to block the light-beam direct emit to home wall.

The optic-lens (30) is install on top of the lower sealed base or prong base (2b) which has built in at least one a circuit, an AC-to-DC circuit, an IC, a switch, a sensor, a trigger-system, a wireless receiver unit, an LED, a colorful LED(s) fit within. The said sealed base or prong base has prong (3) to plug the night light into the outlet. And, the said night light incorporate with preferred circuit to get at least one desired color, brightness, light function, and light-effects including at least one color changing, color selection, motion or dusk-to-dawn, high-low brightness, motion sensor, IR or RF remote controlled, Wi-Fi and download APP for setting/adjustment, power fail light, USB charger, USB power bank, rechargeable battery for backup or power bank use, and other functions.

The said sealed base or prong base (2b) top has at least one opening or window to install The 1st optical piece in geometric shape including at least one a flat, a tube (33) with top reflective-top (32), a dome (33) with reflective-top (32), and a cone-shape (33') with narrow-tip (32') piece with or without optic-properties to let LED light beam go through or spread out to wider angles as co-inventor U.S. patent application Ser. No. 11/806,284, now U.S. Pat. No. 7,632,004 issued date Dec. 15, 2009 which is filed later than the current invention parent filed case Ser. No. 11/498,874 as above listed filing history or background stated.

Figure 9:
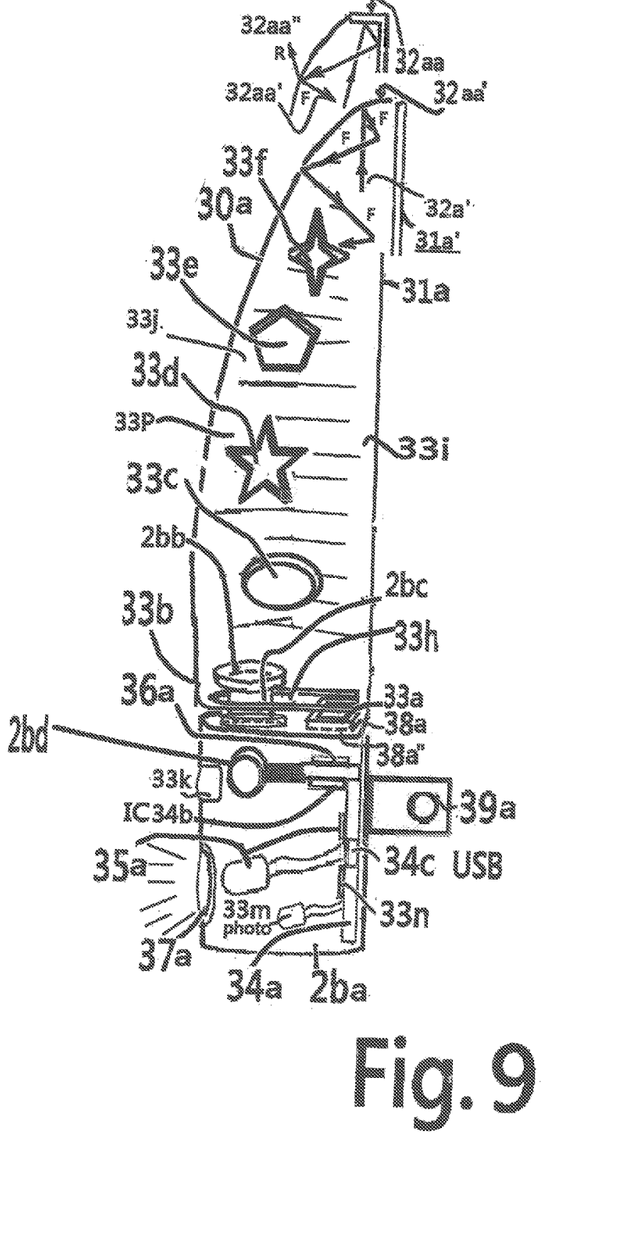
FIG. 9 show the one of improvements embodiment for FIG. 8 which has details parts for LED night light which the said 2nd optical element has open-rear area and night light which the said 1$^{st}$ optical element is one of planar or top flat or curve piece to prevent people to touch the inner or lower position at least one LED(s) and optional additional function(s) select from (1) motion sensor (2) IR or RF wireless receiver (3) more LEDs for power fail light, (4) USB ports for charge other products or be-charged inner rechargeable battery, (5) IC chip to make color changing, color selection, moving or changeable light effects.

From FIG. 8 for parent filed case and FIG. 9 for alternative or up-grade design.

From FIG. 8 the LED (36) in a dip type which is fitted within compartment under the top 1st optic-piece (31) (32) (33) (32') (33') with desired height for longer or shorter which is depend on how prefect illumination and even-brightness want to present and show on the top optic-lens (30) surface.

The alternative or upgrade design show on FIG. 9 which the LED (36a) change to dice or chip or COB LED light source with top opening (38a) to install one top flat shape or planar or ladder construction 1st optic piece (33a) so the at least one white or plurality of colorful LED(s) under the 1st optic piece (33a) emit light beam and light beam go through the 1st optic-piece (33a) to at least top-areas.

The said FIG. 8 and FIG. 9, the LED light beam emit out from 1st optic-piece (31) (32) (33) (38) (32') (33') (33a) emit into the top area and light beam go through multiple-times reflection and refraction between the inner surface of (1) 1st optic-piece, (2) 2nd optic-piece, (3) home wall [;] back-and-forth to make even brightness light beam to present from the top-lens (30) (30a).

The one light beam travel path such as FIG. 9 shown, the light beam (32a') emit to top of inner surface of 2nd optic lens (32aa') and light beam to top-inner surface of 2nd optic lens reflected or-and refracted to more than one directions including the home-wall. The inner surface of 2nd optic lens is one of curved (32aa'), flat (32aa), and preferred shaped. However, either one still make all light beam travel within the inner space of the top 2nd optic lens (30a) and home-wall.

The said 2nd optic-lens (30) (30a) has tongue shape cutout or hole (33h) to snap tight with the base neck or narrow gap (2bc). It is appreciated any snap tight, push tight, screw tighten, sonic sealed, and equal function for assembly skill still fall within the current invention for 2nd optic lens to assemble with sealed or prong base (2b) (2ba) as FIGS. 8, 9 shown.

The said sealed or prong base have preferred at least one circuit, IC (34b), electric parts, switch (2bd), sensors (33k), power fail circuit, LEDs (35a), select-switch (2bd), motion sensor (33k), photo-sensor (33m), USB ports for input or output power (34c), radar sensor (33n), wake-up or sleep light (33p), color changing or areas light (33j), art design (33c) (33d) (33e) (33f), other preferred functions parts and accessories, and prong (39a).

From FIGS. 8, 9 support the independent claim 1, claim 22 with all above detail discussion.

Figures 10, 11, 12, 13:
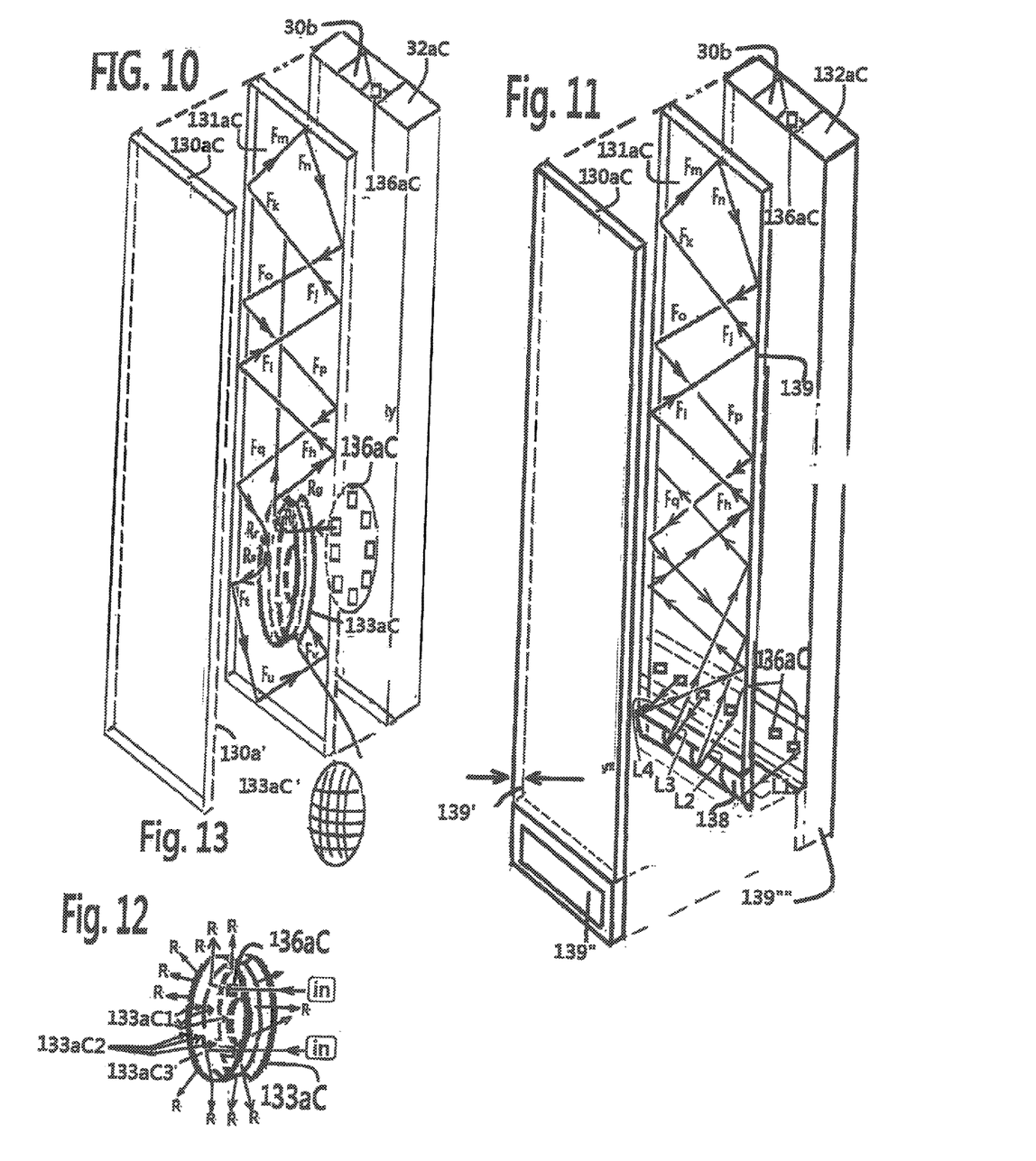
FIG. 10 shows one of 4th alternative multiple functions LED night light has the hidden LED(s) fit within the divided compartment or housing, and LED night light has preferred 1st optical element which has multiple reflective or-and refractive surface(s) to transmit the LED(s) light-beam go through and spread to wider or 360 degree within an isolated narrow space to hit the at least two of inner surface selected from
(1) 1st optics-piece, (2) 2nd optics-piece (3) inner walls of isolated narrow space. So, the light beam go through multiple times reflections and refractions before emit out from the said 2nd optics-piece for substantial even brightness.
FIG. 11 show one of the 5$^{th}$ alternative multiple functions LED night light has the hidden LED(s) fit within the divided compartment or housing and LED night light has preferred 1st optics-element(s) which is one of a curved reflector to reflect all the hidden chip or dice or COB LED(s) having a single or multiple colors into the isolated narrow space for multiple times reflections and refraction within the isolated narrow space. wherein, the area for multiple times reflections or-and refraction is surrounded by at least two of surface(s) selected from (1) 1st optics-piece (2) 2nd optics-piece (3) inner walls of isolated narrow space. So, light beam go through multiple times reflections and refractions before emit out from 2nd optics-piece for substantial even brightness.
FIG. 12 show 1st one of 1st optic-piece which has reflective and refractive surface(s) to receive at least one a single or multiple color(s) LED(s) light beam and go through the said geometric shape 1st optic-piece to emit out to preferred height and directions inside of isolated narrow space for multiple times reflection and refraction within the isolated narrow space and emit out from 2$^{nd}$ optic-lens whole surface.
FIG. 13 show 2nd one of 1st optic-piece which has dome-shape with built-in plurality of texture, optic-design to make the behind LED(s) light-beam go through and spread out to plurality of height and direction(s), and light beam existing from 1st optic-piece emit into the isolated narrow space for multiple times reflections and refractions and emit out from whole 2$^{nd}$ optics-piece surface for substantial even brightness to viewer.

From FIGS. 10, 11 show the LED night light has multiple functions as above discussed with additional preferred functions is at least one (a) Power fail, (b) USB charging ports, (c) USB power bank, (d) Motion sensor, (e) radar sensor, (f) photo sensor, (g) Wi-Fi and download APP, (h) IR or RF wireless control system, and other preferred additional function(s).

From FIG. 10 show the plurality colorful LED(s) (136C) is hidden installation within the inner housing or compartment and people is unable to see any LED super bright spot light at all. The said LED light beam emit to front 1st optic piece which is light passable piece in geometric shapes with more than one reflective and refractive surface as FIG. 12 shown. Wherein, the said 1st optical element has the ladder construction with different level (133aC2) has different diameter or slide or tilt or slope surface for reflective or/and refractive optics function(s). The light beam emit into and go through 1st round multiple times reflections and refractions by 1st optics piece construction and the light beam existing from 1st optic piece (133aC) to emit into the isolate narrow space (13laC) and light beam go through 2nd round multiple times reflections and refractions within the narrow or super narrow isolated space (131aC). The light traveling path as FIG. 13 shown, the light-beam (R) show the refractive function and (F) show reflective function. Following the aaron head wire (→) show the light beam travel to make whole isolated space for substantially uniform brightness to viewer and shown on front $2^{nd}$ optics piece. Wherein, the 2nd optics piece is one of preferred optic lens with at least one of white, opaque, textures, and sand blaster treatment(s) to present substantially uniform brightness light illumination to viewer.

From FIG. 12 and FIG. 13 shown one of preferred or alternative 1st optic piece which change the LED light source spot light beam to wide emit angle light beams into the isolated space which is super narrow so can make perfect multiple times reflections and refractions without loss any brightness because no light beam emit to divided or prong compartment.

From FIG. 11 show the same concept but the 1st optic piece but it is one of curved or geometric shaped reflector which change the input LED light beam to turn directions and get into the isolated narrow space in which has narrow and very limited space so the light beam does not loss any brightness and emit out from front $2^{nd}$ optical element (139').

Wherein, the said light beam reflected by curved reflector into isolated narrow space make multiple times reflections and refractions between of (1) night light inner wall, (2) inner divider wall or surface, (3) inner surface of $2^{nd}$ optic piece for N-times (N is any number) reflections and refractions back-and-forth to make very even brightness all over the isolated narrow space and emit out from front surface of the $2^{nd}$ optics-piece.

From FIG. 11 also show the lower portion or compartment or divided compartment, housing of night light, the divided or separated compartment is a space to install preferred at least one of parts and accessories selected from sensor (139"), radar sensor (139"), IR or RF receiver (139"), PIR motion sensor (139"), photos sensor (139"), sound sensor (139"), and wireless trigger-system (139") to trigger the night light for desired function(s). It also shows the other location has the said other additional function(s) such as window or hole or $2^{nd}$ location (30b) to install for $2^{nd}$ LED(s) (136aC) for power-fail light device or USB ports for charge other products or be-charged built-in rechargeable batteries, or power bank function, or wireless controller receiving device . . . .

From FIGS. 10, 11, 12, 13 show the support for independent claim 2, 18, 24 for LED night light has 1st and $2^{nd}$ optic piece to make even brightness with variety of optics arrangement. These are only limited example and should not limited for all alternative or replaceable or equal function arrangement for has the $1^{st}$ and $2^{nd}$ optical element or piece to make at least one or more round multiple times reflections and refractions within the inner isolated narrow space where are separated or divided with other electric parts and only allow light beam traveling within of the LED light, and not same as diffusing or diffusor optics theory which is sealed all light beam within the optic piece not travel for big space and long distance to loss or waste LED brightness.

Figure 14:
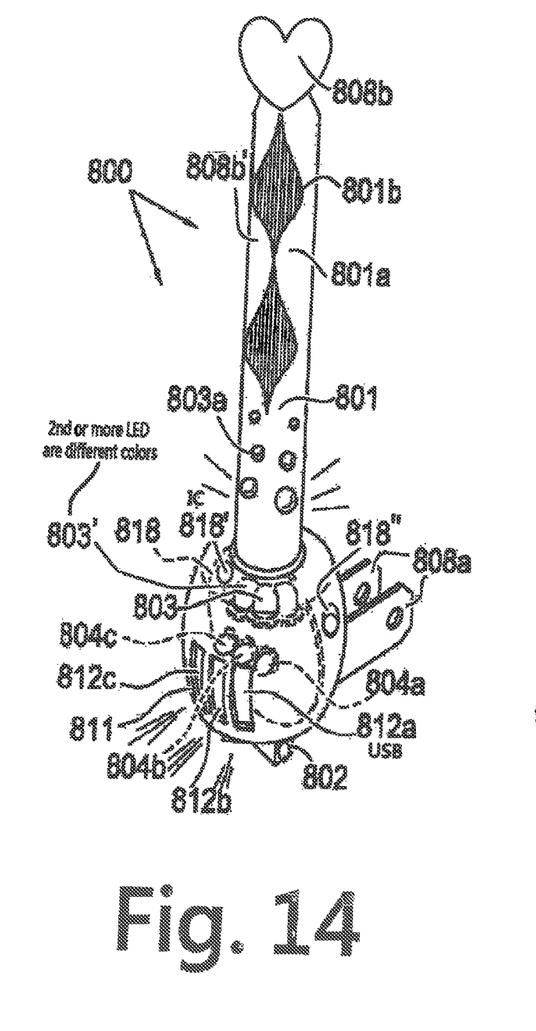
FIG. 14 show up-grade of co-inventor parent filed case which is U.S. patent application Ser. No. 11/255,981 for LED night light has more than one LED light source(s) and each light-source emit to different FIG. 15 show the one of co-invention parent filed case which is U.S. patent application Ser. Nos. 11/255,981 and 12/546,012 which has built-in at least two or two-group LED(s) and the 1st or 1st group of LED(s) emit to 1st direction, and 2nd or 2nd group LED(s) emit to 2nd direction of the said LED light. wherein, the said 1st or 2nd optic-lens is one of a window, an opening, or a geometric shape optical element or lens to show more than one light-source for one LED light device.
Figure 15:
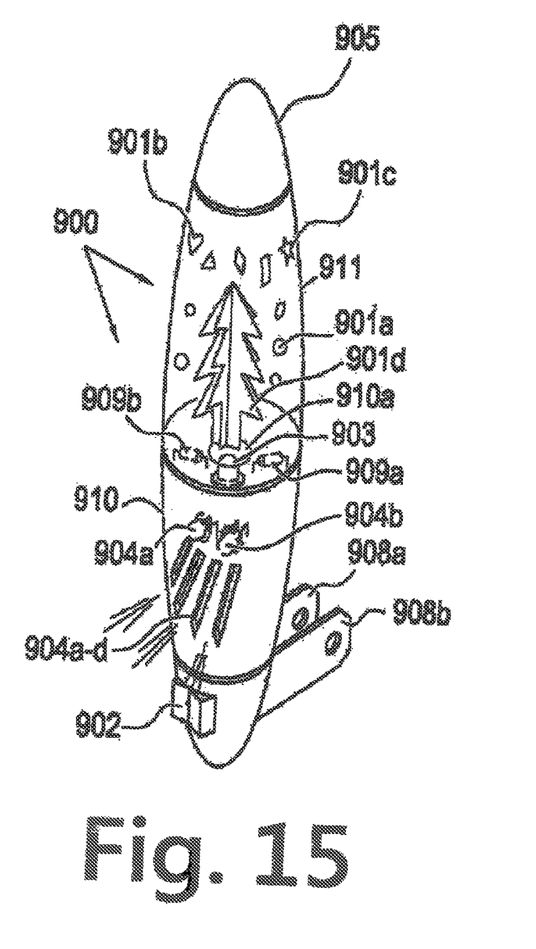

From FIG. 14 and FIG. 15 show co-pending parent filed case the LED night light has the co-inventor co-pending U.S. patent application Ser. Nos. 11/806,284, 11/806,285, 11/498,874, 16/298,110, 16/285,631, 16/242,761, 14/739,499, 14/739,397 and 14/739,666 parent filed case.

The FIG. 15 shows the parent filed case U.S. patent application Ser. No. 11/255,981, filed Oct. 24, 2005, and its child filed case U.S. patent application Ser. No. 12/546,012, filed Aug. 24, 2009, which show the LED night light has at least 2 group of LED.

The said 1st LED (903) or 1st group LED(s) in Dip or dice or chip or COB LED emit light to one direction such as display areas, or light beam illumination present areas. And the 2nd LED or 2nd group LED(s) (904) (904a) emit the light beam to 2nd direction which is 2nd display area(s) or light-beam present-area(s) or window or openings.

Both the 2nd LEDs or 2nd group LED(s) emit the desired light beam for desired purpose at least is one of function and other non-listed purpose including;

(A) Even brightness for comfortable accent light effect(s), or (B) Super bright torch light for power fail or flashlight, or (C) indicator light to show charging, surge protection, full charged, lower power, night light location status or locations.

From FIG. 14 show the alternative which does not apply the Dip LED, it could be any kind of chip or dice or COB LED(s) as light source. It also can have multiple function(s) including has additional functions selected from:

a. Area light (808b), b. Design, arts, printing, painting (801B)

c. Front or top injection light functions (801)

d. Light present optic-piece is one of geometric or cartoon character piece (801)

e. Function, light color, brightness for wired or wireless setting, adjustment (818")

f. $2^{nd}$ or more LEDs for different color, brightness, power consumption (803')

g. Motion, PIR, radar, photos sensor or desired combination (812b)

h. IR, RF, remote, Wi-Fi and download APP or other software for wireless control (not shown)

l. USB ports for supply or be-charged power or power bank functions.

J. Power fail light functions

The said upgrade or alternative function(s) support all the depend claims or current invention as below clear wording.

I claim:

1. An LED night light, comprising:
a lower prong base including prongs configured to be plugged into a power outlet;
at least one LED and an AC-to-DC circuit provided in the lower prong base;
at least one first optical element having a shape selected from the group consisting of a flat, cone, tube, and dome shape, said first optical element at least partially assembled with the prong base and arranged to receive incident light from the at least one LED;
a second optical element coupled to the prong base, and having at least one of a textured finish, a whitening treatment, light passable areas, painting, printing, or an opening,
wherein the LED night light is configured to provide multiple reflections and refractions within the surfaces of the LED night light and a wall to which the LED night light has been attached.

2. The LED night light as claimed in claim 1, further comprising at least one USB port.

3. The LED night light as claimed in claim 1, further comprising at least one rechargeable battery.

4. The LED night light as claimed in claim 1, further comprising at least a second LED arranged to emit light beams for illumination from a location that is different than a location of the at least one LED.

5. The LED night light claimed in claim 1, further comprising at least one sensor selected from the group consisting of motion, PIR, photo, radar, and microwave.

6. The LED night light claimed in claim 1, further comprising at least one of IR, RF, Wi-Fi incorporated with a downloaded APP or other software, and a remote control receiving system.

7. The LED night light claimed in claim 1, further comprising at least one colorful second LED to show charging status, surge protection status, night light locations, or other status.

8. The LED night light claimed in claim 1, further comprising at least one of second LED is a colored LED for color changing, color selection, or light effects.

9. The LED night light as claimed in claim 1, further comprising at least one switch to select, set, adjust, or change at least one of:
(1) hi-low brightness,
(2) a motion or non-motion function,
(3) dusk-to-dawn lighting or manual on-off lighting,
(4) an IC-controlled brightness or color,
(5) a sleeping countdown light or a timer setting light,
(6) a wake-up light with or without timer setting,
(7) an alarm clock on and off setting,
(8) an automatic or non-automatic setting for a power fail light, and
(9) an on, off, or reset setting for surge protection.

10. The LED night light as claimed in claim 1, further comprising at least one of an integrated circuit and switch to provide at least one of color changing, color selection, and fade-in and fade-out; for colorful light effects and desired brightness.

11. The LED night light as claimed in claim 1, further comprising at least one COB (chip on board) light source that emit light beams to a tilted or sloped or reflective surface positioned in front or at a side of the COB to provide even brightness.

12. The LED night light as claimed in claim 1, wherein the at least one LED is one of (1) a chip, dice, or DIP structure, (2) a plurality of different color chips or dice built-inside one LED unit, and (3) a COB LED.

13. The LED night light as claimed in claim 1, wherein the first optical element is at least one of a transparent, reflective and refractive piece.

14. The LED night light as claimed in claim 1, wherein the second optical element has or is at least one of (1) an opening, (2) a cartoon or licensed character shaped body, unit, or mask, (3) at least one hole, and (4) a piece having painting, printing, or cartoon character art.

15. The LED night light as claimed in claim 1, wherein the night light has at least one of a chip, dice, DIP, and COB LED to supply illumination.

16. The LED night light as claimed in claim 1, further comprising a plurality of color LEDs.

17. An LED night light, comprising;
a sealed prong unit having
(1) at least one built-in prong,
(2) at least one LED,
(3) at least one of circuitry, a trigger-system, a sensor, and a switch, and
(4) an AC-to-DC circuit,
with or without an integrated circuit to cause the LED night light to exhibit at least one of a single, multiple, or variable light color, brightness, function, or effect,
a first optical element in front or on a side of the at least one LED to receive LED light beams and eliminate LED bright spots, and create substantially uniform light beams, and
at least one second optical element that having an opening on at least one of a rear, top, and side, and that is assembled to the sealed prong unit,
wherein the substantially uniform light beams are shown on a front surface of the second optical element and wherein the LED light beams are also emitted to a home wall having an AC outlet for plugging the night light into.

18. A LED night light, comprising;
at least one dice or chip LED mounted on a printed circuit board;
at least one prong unit having an isolated individual space containing only the at least one LED and printed circuit board so that light beam traveling within the space does not encounter other electric parts within the space;
at least one first optical element fitted within the prong unit and positioned in front or on a side of the at least one LED, which is at least one of a single color LED and multiple different color dice or chips built-in a single LED; and
at least one second optics-piece having at least one of a cartoon mask and a cartoon character piece having an opening or light transmitting window treatment, and
wherein the night light is configured to provide multiple reflections and refractions within the isolated individual space inside the prong unit to eliminate super bright LED lighted spots, the light beams exiting from the isolated individual space being emitted to the second optical element which has an opening on at least one of a rear, top, or side to enable the light beams to be projected onto a wall to which the LED light has been attached,
wherein at least a portion of the uniform light is emitted to a wall having an AC outlet for plugging the LED night light into.

* * * * *